Figure 1:
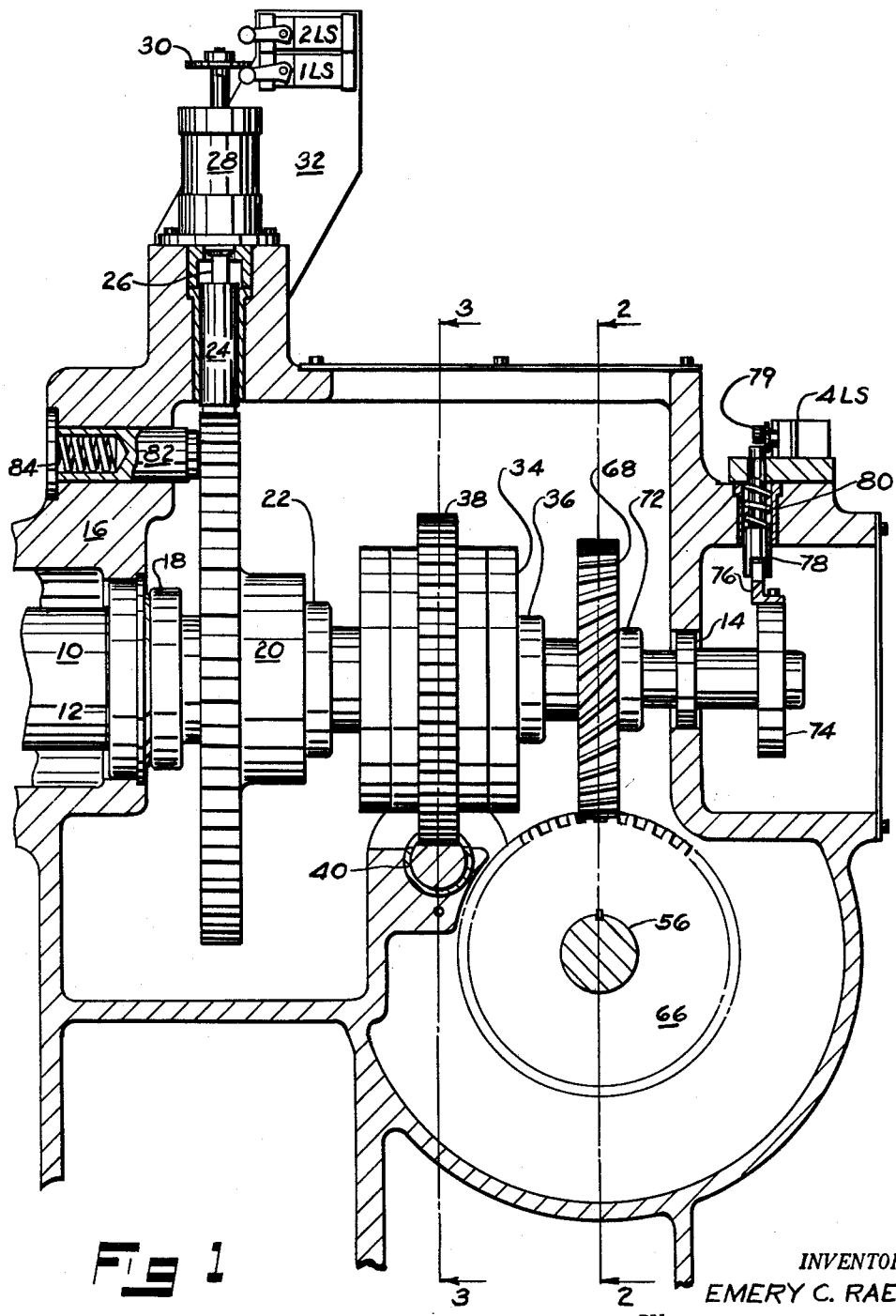

Sept. 29, 1964 — E. C. RAEHRS — 3,150,545
INDEXING MECHANISM
Filed May 29, 1961 — 3 Sheets-Sheet 1

INVENTOR.
EMERY C. RAEHRS
BY
ATTORNEYS

Sept. 29, 1964 E. C. RAEHRS 3,150,545
INDEXING MECHANISM
Filed May 29, 1961 3 Sheets-Sheet 2

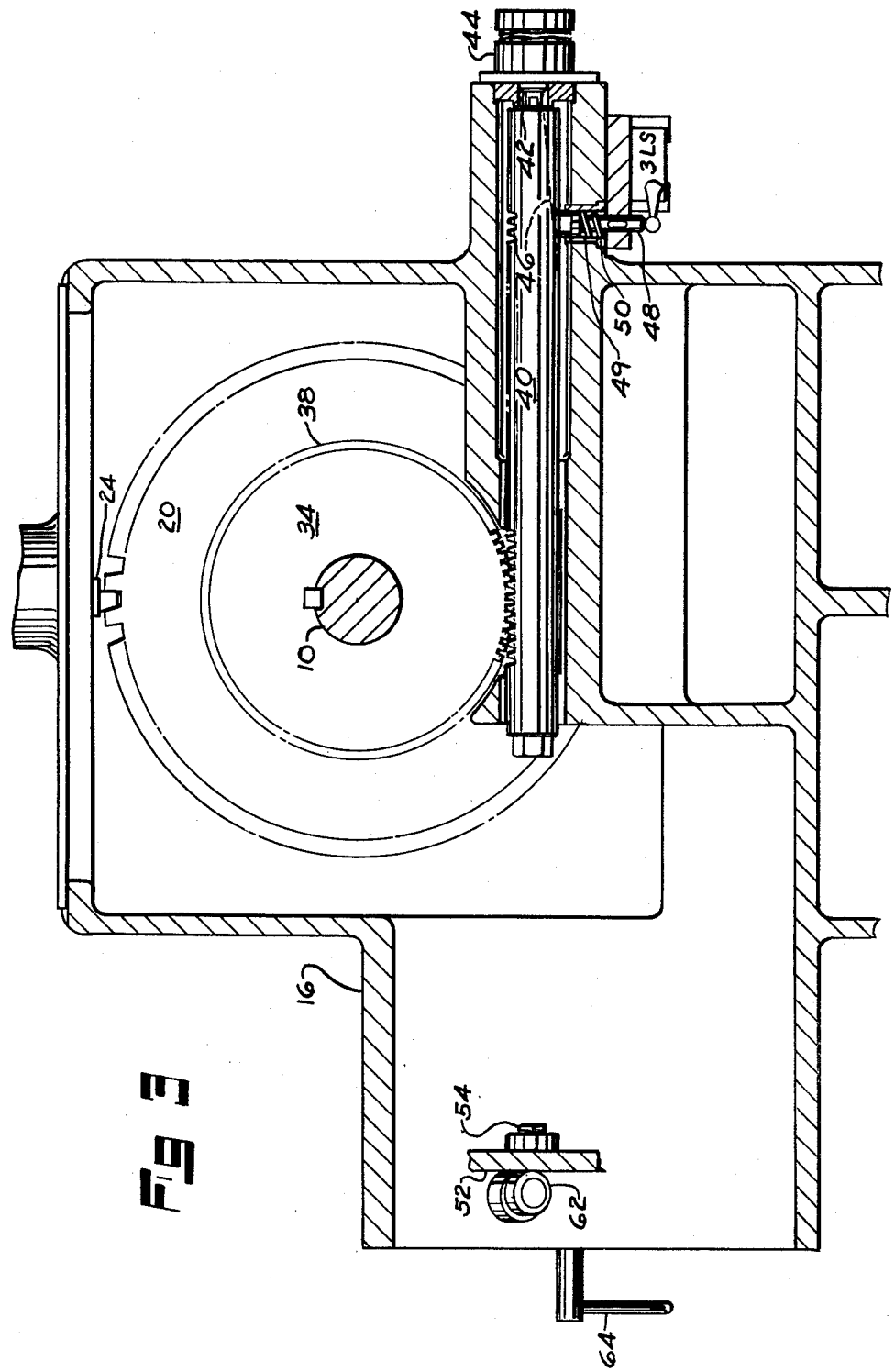

United States Patent Office 3,150,545
Patented Sept. 29, 1964

3,150,545
INDEXING MECHANISM
Emery C. Raehrs, Cincinnati, Ohio, assignor to The Cincinnati Milling Machine Co., Cincinnati, Ohio, a corporation of Ohio
Filed May 29, 1961, Ser. No. 113,503
7 Claims. (Cl. 74—817)

This invention relates to an automatic indexing mechanism and is particularly suited for selectively and accurately rotating a member from one position to the next through a series of predetermined angular positions.

In the machine tool industry, indexing mechanisms must be accurate yet capable of withstanding large stresses without yielding. A machine tool indexing mechanism also is subjected frequently to continuous operation for long periods of time under the most adverse conditions. Therefore, the indexing mechanism must be reliable as well as durable and must require a minimum of maintenance attention.

While there are a great many mechanisms available to provide automatic indexing through equal angular positions which are acceptable by machine tool standards, there are few automatic variable indexing devices available that are inherently trouble free under the adverse operating conditions found in a machine shop. Various index control schemes have been worked out using electrical position controls, for example, photo-electric and proximity switch systems. These electrical systems are not suitable for use with machines where a great amount of lubricant, water emulsion coolants, and machining wastes are present.

It is therefore an object of this invention to provide an automatic variable indexing mechanism whereby the indexed positions are mechanically achieved.

Another object is to provide an automatic index mechanism which is accurate, rigid, and durable to reduce maintenance problems resulting from operation in adverse environments.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the preferred form of this invention, an index spindle is provided to drive the member which must be rotated through a series of angular positions. The index spindle is driven by a variable stroke ratchet mechanism. The stroke of the ratchet mechanism is controlled by a turret stop which is movable through a series of positions, each of which allows a stroke of the ratchet mechanism to produce a predetermined angular movement of the index spindle. As the index spindle is moved, the motion is connected through a mechanical feed back drive to the turret stop which is moved to its next position. An index plate is fixed to the index spindle and a mechanical detent is adapted to engage the index plate and lock the index spindle in the selected predetermined position until such time as the index spindle again must be moved. The detent is then withdrawn from the index plate to allow the indexing mechanism to operate.

Figure 2:
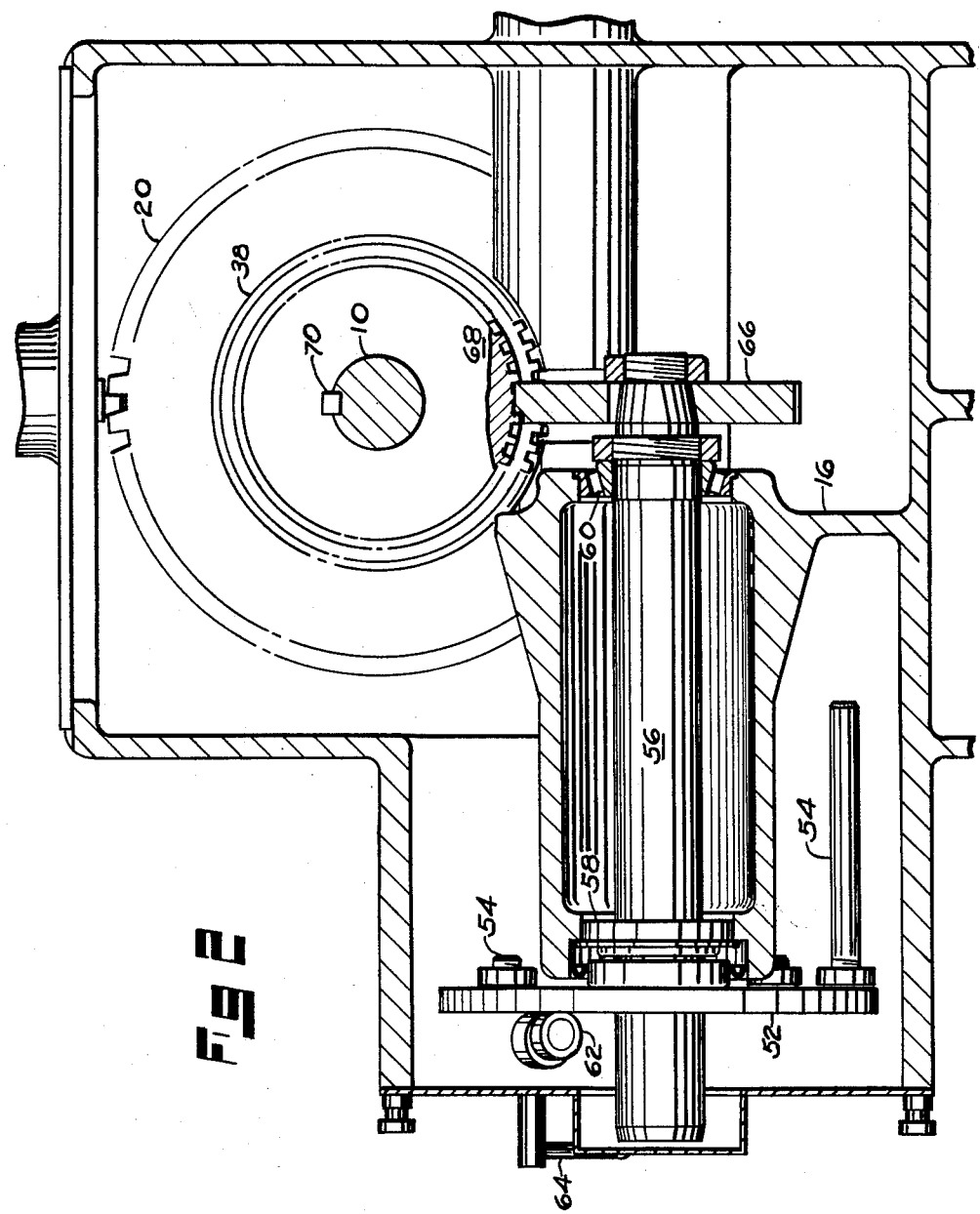

A complete understanding of the construction and operation of the indexing mechanism of this invention can be obtained from the following detailed description and the attached drawings wherein:

FIG. 1 is a sectional view of an indexing mechanism.
FIG. 2 is a sectional view of the mechanism of FIG. 1 on line 2—2.
FIG. 3 is a sectional view of the mechanism of FIG. 1 on line 3—3.

The sectional view of FIG. 1 shows an index spindle 10 journaled in bearings 12, 14 for rotation in the housing 16. The bearing 14 is press fitted in the housing 16 while the tapered roller bearing 12 is retained on the spindle 10 by the ring nut 18. The end of the spindle 10 at the left (not shown) is adapted to drive a member which is required to be rotatably positioned through a series of angular positions. The angular distance between positions varies as the spindle 10 is moved through the series of positions. An index disc or plate 20 is keyed to rotate with the spindle 10 and fixed thereon by a ring nut 22. The plate 20 is notched around its periphery (see FIG. 3) at predetermined locations, for example, the plate 20 may be notched every 7½ degrees for use in indexing through any angular distance which is a multiple thereof. A detent pin 24 is slidably received in the housing 16 and has an end adapted to engage the plate 20 in the notches thereon in a wedging fashion (see FIG. 3) to rigidly and accurately lock the spindle 10 in a selected position. The pin 24 is fixed on an end of a piston rod 26 which extends from one end of a piston and cylinder motor 28 fixed on the top of the housing 16. The piston rod 26 extends through the piston and cylinder 28 and the end opposite the pin 24 has a trip disc 30 fixed thereon. The trip disc 30 is adapted to operate two limit switches 1LS and 2LS which are fixed on a bracket 32 on top of the housing 16. The limit switch 1LS is operated by the disc 30 when the pin 24 is engaged with the plate 20 and the limit switch 2LS is operated when the pin 24 is withdrawn from the plate 20.

An overrunning clutch 34 is received on the spindle 10 and held in place by a ring nut 36. The clutch 34 may be of any well known form which will allow the spindle 10 to be driven in one direction only. An example of such a clutch is a Formsprag overrunning clutch manufactured by the Formsprag Company and well known in the machine tool industry. An index gear 38 is received over the clutch 34. By operation of the clutch 34, the gear 38 is rotatable with the spindle 10 in one direction and is rotatable relative thereto in the other direction.

The gear 38 is engaged by an actuating member or rack 40 which is slidably received in the housing 16. As shown in FIG. 3, the rack 40 is fixed to the end of a piston rod 42 which extends from a piston and cylinder motor 44 that is reversibly operable to move the rack 40 one way and the other. The rack 40 has an inclined surface 46 which is engaged by a plunger 48 slidably received in a bushing 49 in the housing 16 and biased toward the rack 40 by a spring 50. The plunger 48 operates a limit switch 3LS when the rack 40 is in the starting position shown. When the rack 40 is moved to the left, as viewed in FIG. 3, the gear 38 is rotatable relative to the spindle 10. When the rack 40 is moved to the right, the clutch 34 causes the gear 38 and rack 40 to rotate the spindle 10 an amount determined by the length of stroke of the rack 40. The combination of the motor 44, rack 40, gear 38, and clutch 34 is a ratcheting mechanism by which the spindle 10 may be rotated in one direction by angular increments or steps, the angular distance of the steps depending on the length of the stroke of the rack 40.

The length of stroke of the rack 40 is determined by the angular position of a turret stop 52 which has a set of pins 54 of different lengths fixed thereto and extending toward the rack 40. The turret stop 52 is best shown in FIG. 2. It is fixed on a shaft 56 which is journaled in tapered roller bearings 58, 60 for rotation in the housing 16. The back of the stop 52 is engaged by a roller 62 which is located in line with the rack 40 (FIG. 3) and holds the stop 52 rigid when a pin 54 is engaged by the rack 40. The roller 62 is locked in place by an eccentric locking cam (not shown) which is released by operation of the handle 64. When the roller 62 is unlocked, it may be retracted and the turret stop 52 may be changed or replaced with another which will allow for other variable index steps.

A helical gear 66 is fixed in the end of the shaft 56 and is engaged by another and identical gear 68 fixed on the spindle 10 by a key 70 and a ring nut 72 (FIG. 1). Thus, the shaft 56 is rotated when the spindle 10 is rotated and the turret stop position is changed each time the spindle 10 is indexed. The gears 66, 68 provide a mechanical feed back link from the spindle 10 to index a new stop pin 54 to position in line with the rack 40. The pins 54 must be spaced in predetermined positions around the turret stop 52 and the spacing between adjacent pins 54 must correspond to the angle through which the spindle 10 is indexed by the stroke of the rack 40. In the exemplary mechanism shown, the angular distance between the centers of the pins 54 is the same as the angular distance of index of the spindle 10 from one position to another since the spindle 10 and shaft 56 rotate in a one to one relationship.

The spindle 10 also has a trip disc 74, FIG. 1, fixed on one end. The trip disc 74 is adapted to receive dogs 76 which are operable to trip limit switches, as for example limit switch 4LS, through operation of the roller-tipped plunger 78 biased toward the disc 74 by spring 80 and adapted to engage the lever arm 79 of the limit switch 4LS. The limit switch 4LS is utilized to signal the complete revolution of the spindle 10 through the series of index steps provided by the turret stop 52 and the pins 54 which are spaced therearound.

In FIG. 1 a drag plunger 82 is shown extending from the housing 16 and biased toward the index plate 20 by a spring 84. The friction between the plunger 82 and the plate 20 counteracts the effect of the inertia of a heavy member rotated by operation of the index mechanism which would tend to cause the spindle 10 and index plate 20 to overshoot a desired position and thus prevent the pin 24 from being properly engaged with the plate 20 by the motor 28.

In operation, the mechanism described might be used, for example, on a milling machine to index a workpiece through a series of angular positions in each of which a cutting operation might be performed on the workpiece. The milling machine can be equipped in well known manner to operate in automatic cycle and once started, the cycle would continue until the workpiece is finished, the cycle including operations to be performed on the workpiece while positioned in various angular positions by the described mechanism.

At the start of the cycle, the piston and cylinder motor 44, FIG. 3, is energized to move the rack 40 from the starting position to the left (as viewed in FIG. 3) and the rack 40 engages the first of the stop pins 54 in the turret stop 52. The length of the first of the pins 54 determines the length of the first stroke of the rack 40. The gear 38 is rotated relative to the spindle 10 which remains fixed through the engagement of the detent pin 24 and plate 20.

The piston and cylinder motors 28 and 44 are sequentially operated and after the stroke of the rack 40 is stopped by the first pin 54, the motor 28, FIG. 1, is operated to withdraw the pin 24 from the plate 20. When the pin 24 is withdrawn, the limit switch 2LS is operated to reverse operation of the motor 44, FIG. 3, which then moves back to the position shown. The gear 38 is now rotated counter-clockwise (as viewed in FIG. 3) with the spindle 10 an amount determined by the length of the return stroke of the rack 40 which is equal to the length of stroke in the other direction. At this same time the turret 52 is rotated by the operation of gears 66, 68, FIG. 2, to position the next of pins 54 in line with the rack 40.

When the rack 40 has returned to the position shown in FIG. 3, the limit switch 3LS is operated by the plunger 48 which produces a signal causing the motor 28 to be reversely operated to re-engage the pin 24 with the plate 20 to lock the spindle 10 against further rotation. When the pin 24, FIG. 1, is re-engaged limit switch 1LS is operated to signal the start of a machining operation. The end of the machining operation produces another signal which initiates the operation of the index mechanism again. The indexing continues alternately with operation of the milling machine. The angular distance of each index step is determined by the length of one of the pins 54. When the limit switch 4LS is operated by the dog 76 and the plunger 78, the automatic operation of the machine and index mechanism is stopped.

The spacing and length of the pins depends upon the desired angles. By choice of the length of pins 54 and spacing thereof on the turret stop 52, the mechanism may be used to produce a series of angular positions of the spindle 10 which need not be evenly spaced. However, there must be a notch in the plate to lock the mechanism at each predetermined position. In the example described, the index plate 20 has a notch at every 7½ degree point so that any angle a multiple of 7½ may be indexed by the use of a turret stop 52 with pin length and spacing adjusted to provide the stroke length of the rack 40 to produce the desired angular movement of the spindle 10.

What is claimed is:

1. A mechanism operable to effect angular indexing of a member in predetermined angular steps comprising, a rotatable index spindle, an activating member, motor means reversibly to move said activating member through a stroke, means responsive to movement of said activating member in one direction to rotate said index spindle an amount corresponding to the length of stroke of said activating member, stop means to limit the length of said stroke in accordance with the position of said stop means and means responsive to movement of said index spindle to move said stop means from one predetermined position to another predetermined position.

2. A mechanism operable to effect angular indexing of a member in predetermined angular steps comprising, a rotatable index spindle, releasable locking means to hold said index spindle in predetermined angular positions when moved thereto, an activating member, motor means reversibly to move said activating member through a stroke, means responsive to movement of said activating member in one direction to rotate said index spindle an amount corresponding to the length of stroke of said activating member, stop means to limit the length of said stroke in accordance with the position of said stop means when said activating member is moved in the other direction, and means responsive to movement of said index spindle to move said stop means from one predetermined position to another predetermined position.

3. A mechanism operable to effect angular indexing of a member in predetermined angular steps comprising, a rotatable index spindle, releasable locking means to hold said index spindle in predetermined angular positions when moved thereto, an activating member, motor means reversibly to move said activating member through a stroke, means responsive to movement of asid activating member in one direction to rotate said index spindle an amount corresponding to the length of stroke of said activating member, a turret stop having a plurality of pins of predetermined lengths fixed thereto in predetermined locations, each of said pins adapted to limit movement of said activating member in the other direction when said turret stop is in a corresponding predetermined position to limit the length of stroke of said activating member, and means responsive to movement of said index spindle to move said turret stop from one predetermined position to another predetermined position.

4. A mechanism operable to effect angular indexing of a member in predetermined angular steps comprising, a rotatable spindle, releasable locking means to hold said index spindle in predetermined angular positions when moved thereto, a gear received on said index spindle for rotation thereof when said gear is rotated in one direction and rotatable relative thereto when said gear is rotated in the other direction, a rack engaged with said gear for rotation thereof when said rack is longitudinally moved, motor means reversibly to move said rack through a stroke, a rotatable turret stop having a plurality of pins of predetermined lengths fixed thereon in predetermined angular spaced relation, each of said pins in registration with said rack at a predetermined angular position of the turret stop to limit movement of said rack when said gear is rotated in the other direction and limit the length of said stroke in accordance with the length of the pin, and means responsive to movement of said index spindle to rotate said turret stop from one predetermined position to the next.

5. A mechanism operable to effect angular indexing of a member in predetermined angular steps comprising, a rotatable index spindle, an index plate fixed to said index spindle, a detent adapted to engage said index plate in predetermined locations corresponding to predetermined angular positions of said index spindle to prevent movement thereof, means to remove said detent from said index plate and to return said detent to said index plate, a gear received on said index spindle for rotation thereof when said gear is rotated in one direction and rotatable relative thereto when said gear is rotated in the other direction, a rack engaged with said gear for rotation thereof when said rack is longitudinally moved, motor means reversibly to move said rack through a stroke, a turret stop having a plurality of pins of predetermined lengths fixed thereon in predetermined angular relation, each of said pins in axial alignment with said rack at a predetermined angular position of said turret stop to limit the length of stroke of said rack when said gear is rotated in the other direction to limit said stroke in accordance with the length of the engaged pin, and means responsive to movement of said index spindle to rotate said turret stop from one predetermined position to another predetermined position.

6. A mechanism operable to effect automatic indexing of a member in predetermined angular steps comprising, a rotatable index spindle, an index plate fixed to said index spindle and notched around the periphery thereof, a detent pin adapted to engage said index plate in a notch thereof to lock said spindle in a predetermned angular position corresponding to the notch thereof engaged thereby, an overrunning clutch received on said index spindle, an index gear received over said clutch, a reciprocable rack engaged with said index gear, motor means to reversibly move said rack from a starting position through a stroke for rotation of said index spindle when said rack is moved in one direction and for rotation of said gear relative to said index spindle when said rack is moved in the other direction, motor means to remove said pin from said index plate when said rack is moved in said one direction, a turret stop having a plurality of pins of predetermined lengths fixed thereon in predetermined angular relation, each of said pins in axial alignment with said rack at a predetermined angular position of said turret stop, and adapted to engage said rack when said rack is moved in said other direction to limit the length of stroke of said rack in one and the other directions from the starting position, and a feed back gear fixed on said spindle and adapted to effect rotation of said turret stop from one position to another position thereof when said spindle is rotated.

7. A mechanism operable to effect automatic angular indexing of a member in predetermined angular steps comprising, a rotatable index spindle, releasable means to lock said spindle in each of a series of predetermined positions, a one way clutch drive mechanism operable to effect an increment of rotation of said spindle, a stop member movable to predetermined positions and operable in each position thereof to define an increment of rotation of said spindle, and feedback means responsive to rotation of said spindle to move said stop member from one predetermined position to another thereof.

References Cited in the file of this patent

UNITED STATES PATENTS

| 2,123,978 | Wagner | July 19, 1938 |
| 2,192,251 | Whittaker | Mar. 5, 1940 |
| 2,543,759 | Cannon et al. | Mar. 6, 1951 |
| 2,883,886 | Benjamin | Apr. 28, 1959 |
| 2,905,029 | Gustafson | Sept. 22, 1959 |
| 2,978,158 | Herr | Apr. 4, 1961 |
| 3,004,525 | Emain | Oct. 17, 1961 |
| 3,085,452 | Thompson | Apr. 16, 1963 |

FOREIGN PATENTS

| 1,084,904 | France | July 13, 1954 |
| 1,239,161 | France | July 11, 1960 |